(12) United States Patent
Yu

(10) Patent No.: US 10,268,082 B2
(45) Date of Patent: Apr. 23, 2019

(54) DISPLAY PANEL AND METHOD OF MANUFACTURING THE SAME, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Feng Yu, Beijing (CN)

(73) Assignees: BOE TECHNOLOGY GROUP CO., LTD., Beijing (CN); HEFEI BOE OPTOELECTONICS TECHNOLOGY CO., LTD., Hefei, Anhui (CN)

( * ) Notice: Subject to any disclaimer, the term of this patent is extended or adjusted under 35 U.S.C. 154(b) by 57 days.

(21) Appl. No.: 15/506,467

(22) PCT Filed: Jul. 13, 2016

(86) PCT No.: PCT/CN2016/089862
§ 371 (c)(1),
(2) Date: Feb. 24, 2017

(87) PCT Pub. No.: WO2017/117961
PCT Pub. Date: Jul. 13, 2017

(65) Prior Publication Data
US 2018/0107034 A1 Apr. 19, 2018

(30) Foreign Application Priority Data
Jan. 5, 2016 (CN) .......................... 2016 1 0005831

(51) Int. Cl.
*G02F 1/1339* (2006.01)
*G02F 1/1333* (2006.01)

(52) U.S. Cl.
CPC .......... *G02F 1/1339* (2013.01); *G02F 1/1333* (2013.01); *G02F 2001/133354* (2013.01)

(58) Field of Classification Search
CPC ...................................................... G02F 1/1339
See application file for complete search history.

(56) References Cited

U.S. PATENT DOCUMENTS

| 5,525,273 A * | 6/1996 | Konuma | ............... G02F 1/1334 264/1.36 |
| 6,373,548 B1 * | 4/2002 | Kim | ...................... G02F 1/1333 257/797 |

(Continued)

FOREIGN PATENT DOCUMENTS

| CN | 101071210 A | 11/2007 |
| CN | 101211041 A | 7/2008 |

(Continued)

OTHER PUBLICATIONS

International Search Report and Written Opinion dated Oct. 19, 2016; PCT/C2016/089862.

(Continued)

*Primary Examiner* — Sang V Nguyen
(74) *Attorney, Agent, or Firm* — Ladas & Parry LLP

(57) ABSTRACT

A display panel and a method of manufacturing the same, and a display device. The display panel includes: a first substrate and a second substrate disposed opposite to each other; a liquid crystal layer between the first substrate and the second substrate; a sealant provided on a periphery of the first substrate and the second substrate for bonding the first substrate and the second substrate; and a first alignment mark disposed on the first substrate and a second alignment mark disposed on the second substrate; the second alignment mark is provided on a side, adjacent to the liquid crystal layer, of the sealant, and the first alignment mark and the second alignment mark match in a plan view direction (Continued)

according to their preset shapes. By providing a first alignment mark and a second alignment mark, the accuracy of the two substrates can be improved effectively, and the application accuracy of the sealant can be further improved.

19 Claims, 3 Drawing Sheets

(56) References Cited

U.S. PATENT DOCUMENTS

| | | | | |
|---|---|---|---|---|
| 2001/0052960 A1* | 12/2001 | Saito | ............... | G02F 1/133512 349/155 |
| 2007/0247584 A1* | 10/2007 | Li | ............... | G02F 1/13394 349/156 |
| 2008/0158496 A1* | 7/2008 | Kim | ............... | G02F 1/13394 349/151 |
| 2013/0278858 A1* | 10/2013 | Hashimoto | ....... | G02F 1/133512 349/58 |
| 2015/0362770 A1* | 12/2015 | Yang | ............... | G02F 1/133512 349/42 |
| 2016/0195761 A1* | 7/2016 | Liu | ............... | G02F 1/133514 257/88 |
| 2016/0252753 A1* | 9/2016 | Deng | ............... | G03F 9/7088 29/281.5 |
| 2016/0363820 A1* | 12/2016 | Li | ............... | G02F 1/1337 |

FOREIGN PATENT DOCUMENTS

| | | |
|---|---|---|
| CN | 1104297982 A | 1/2015 |
| CN | 104460124 A | 3/2015 |
| CN | 105445986 A | 3/2016 |
| JP | 2000-056314 A | 2/2000 |

OTHER PUBLICATIONS

The First Chinese Office Action dated Jun. 9, 2017; Appln. No. 201610005831.7.

* cited by examiner

DISPLAY PANEL AND METHOD OF MANUFACTURING THE SAME, AND DISPLAY DEVICE

TECHNICAL FIELD

Embodiments of the present disclosure relate to a display panel and a method of manufacturing the same, and a display device.

BACKGROUND

With the increasing development of technologies and manufacturing processes, thin film transistor liquid crystal displays (TFT-LCDs) have become the mainstream device of flat panel displays. The core component of a TFT-LCD is a display panel, and the liquid crystal display panel mainly comprises a color filter (CF) substrate, an array substrate, and a liquid crystal layer between the color filter substrate and the array substrate. In a cell-assembling process, a sealant is used to bond the four sides of the two substrates and to seal the liquid crystal layer between the two substrates as well.

With the research and development on narrow-frame display devices, the layout of the display panel becomes more and more compact, which places higher demands on the alignment accuracy of the color filter substrate and the array substrate. If the alignment accuracy of the color filter substrate and the array substrate is insufficient, the position where the sealant is applied becomes quite close to the liquid crystal, making it easy for the sealant to contact with the liquid crystal and contaminate the liquid crystal, thereby affecting the quality of the product.

SUMMARY

At least one embodiment of the present disclosure provides a display panel and a method of manufacturing the same, and a display panel. The display panel can solve the problem of low application accuracy of the sealant.

At least one embodiment of the present disclosure provides a display panel comprises: a first substrate and a second substrate disposed opposite to each other; a liquid crystal layer between the first substrate and the second substrate; a sealant provided on a periphery of the first substrate and the second substrate for bonding the first substrate and the second substrate; and a first alignment mark disposed on the first substrate and a second alignment mark disposed on the second substrate. The second alignment mark is provided on a side, adjacent to the liquid crystal layer, of the sealant, and the first alignment mark and the second alignment mark match in a plan view direction according to their preset shapes.

For example, the display panel according to an embodiment of the present disclosure, the first alignment mark is provided in a same layer as any film layer on the first substrate.

For example, the display panel according to an embodiment of the present disclosure, the first substrate is provided with a passivation layer, a source/drain electrode layer, an active layer, a pixel electrode layer, a common electrode layer, a gate insulation layer, or a gate electrode layer.

For example, the display panel according to an embodiment of the present disclosure, the second alignment mark is provided in a same layer as any film layer on the second substrate.

For example, the display panel according to an embodiment of the present disclosure, the second substrate is provided with a spacer, a black matrix, or a color resist layer.

For example, the display panel according to an embodiment of the present disclosure, the preset shape of the first alignment mark includes a right angle shape, an incompletely closed rectangle, or a closed rectangle.

For example, the display panel according to an embodiment of the present disclosure, the shape of the second alignment mark is complementary to or at least partially overlaps the shape of the first alignment mark in a plan view direction.

For example, the display panel according to an embodiment of the present disclosure, a thickness of the second alignment mark is the same as a distance between the first substrate and the second substrate.

For example, the display panel according to an embodiment of the present disclosure, the sealant comprises a skeleton component comprising at least one of a silicon sphere and a glass fiber.

For example, the display panel according to an embodiment of the present disclosure, the skeleton component accounts for greater than or equal to 0 and less than or equal to 1% by mass of the sealant.

At least one embodiment of the present disclosure provides a display device, comprising any of the above display panels.

At least one embodiment of the present disclosure provides a method of manufacturing a display panel, comprising: providing a first substrate and a second substrate opposite to each other; forming a first alignment mark on a periphery of the first substrate by a patterning process; forming a second alignment mark on a periphery of the second substrate by a patterning process; matching the first alignment mark with the second alignment mark in a plan view direction according to their preset shapes; applying a sealant between the first substrate and the second substrate and on an outer side of the second alignment mark; forming a liquid crystal layer on an inner side of the second alignment mark; and assembling the first substrate and the second substrate by aligning the first alignment mark with the second alignment mark in accordance with the preset shapes.

For example, the method of manufacturing the display panel according to an embodiment of the present disclosure, the first alignment mark and any film layer on the first substrate are formed by a single patterning process.

For example, the method of manufacturing the display panel according to an embodiment of the present disclosure, the first substrate is provided with a passivation layer, a source/drain electrode layer, an active layer, a pixel electrode layer, a common electrode layer, a gate insulation layer, or a gate electrode layer.

For example, the method of manufacturing the display panel according to an embodiment of the present disclosure, the second alignment mark and any film layer on the second substrate are formed by a single patterning process.

For example, the method of manufacturing the display panel according to an embodiment of the present disclosure, the second substrate is provided with a spacer layer, a black matrix layer, or a color resist layer.

For example, the method of manufacturing the display panel according to an embodiment of the present disclosure, the preset shape of the first alignment mark includes a right angle shape, an incompletely closed rectangle, and a closed rectangle.

For example, the method of manufacturing the display panel according to an embodiment of the present disclosure, the shape of the second alignment mark is complementary to or at least partially overlaps the shape of the first alignment marks in a plan view direction during assembling the first substrate and the second substrate.

For example, the method of manufacturing the display panel according to an embodiment of the present disclosure, the second alignment mark has a thickness which is the same as a distance between the first substrate and the second substrate.

BRIEF DESCRIPTION OF THE DRAWINGS

In order to clearly illustrate the embodiments of the present disclosure or the technical solutions of the state of art, the drawings which are required to be used in the embodiments or the prior art will be briefly described below. Apparently, the drawings described below relate to only some embodiments of the present disclosure, and the other drawings can be further obtained by a person of ordinary skill in the art without any creative labor.

DETAILED DESCRIPTION

To make clearer the objects, technical solutions and advantages of the embodiments of the present disclosure, a clear and full description of the technical solutions of the embodiments of the present disclosure will be made with reference to the accompanying drawings of the embodiments of the present disclosure. Apparently, the described embodiments are just part rather than all of the embodiments of the present disclosure. Based on the embodiments of the present disclosure described, all the other embodiments obtained by a person of ordinary skill in the art, without any creative labor, fall within the scope of protection of the present disclosure.

Embodiment 1

Figure 1:
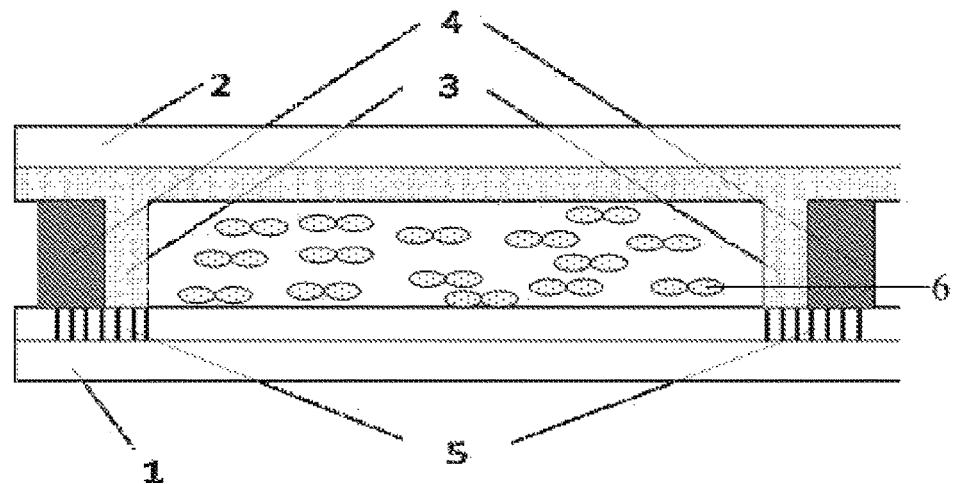
FIG. 1 is a schematic cross-sectional view of a display panel.

The present embodiment provides a display panel. As illustrated in FIG. 1, which is a schematic cross-sectional view of a display panel, the display panel comprises a first substrate 1 and a second substrate 2 disposed opposite to each other, a liquid crystal layer 6 interposed between the first substrate 1 and the second substrate 2, a sealant 4 provided on a periphery of the first substrate 1 and the second substrate 2 for bonding the first substrate 1 and the second substrate 2, a first alignment mark 5 disposed on the first substrate 1, and a second alignment mark 3 disposed on the second substrate 2. The second alignment mark 3 is provided on a side, adjacent to the liquid crystal layer 6, of the sealant 4, i.e., the second alignment mark 3 is provided between the sealant 4 and the liquid crystal layer 6. On the basis of the above design, the assembling accuracy can be effectively improved and the assembling process can be detected by matching the first alignment mark 5 with the second alignment mark 3 in a plan view in accordance with their preset shapes. In addition, the second alignment mark 3 can also prevent diffusion of the uncured sealant, thereby improving the application accuracy of the sealant.

As illustrated in FIG. 1, the first alignment mark 5 at least partially overlaps the second alignment mark 3, and further comprises a second portion corresponding to the sealant in addition to a first portion matching the second alignment mark 3.

For example, the first alignment mark can be further provided with a plurality of tick marks which can be used to further improve the alignment accuracy.

For example, the second alignment mark 3 and the sealant 4 can also partially overlap with each other.

The first alignment mark 5 is provided in the same layer as any film layer on the first substrate 1. The film layer provided on the first substrate comprises a passivation layer, a source/drain electrode layer, an active layer, a pixel electrode layer, a common electrode layer, a gate insulation layer or a gate electrode layer. For example, the materials of the source/drain electrode layer and the gate electrode layer include any one or any combination of copper, molybdenum and titanium; the material of the gate insulation layer includes silicon nitride ($SiN_x$), silicon oxide ($SiO_x$), aluminum oxide ($Al_2O_3$), aluminum nitride (AlN) or other suitable material; the material of the passivation layer includes silicon nitride ($SiN_x$), silicon oxide ($SiO_x$), or an acrylic resin; the material of the active layer includes an oxide semiconductor, a polysilicon semiconductor or the like; the materials of the pixel electrode layer and the common electrode layer include a transparent conductive material, for example, tin indium oxide (ITO), indium zinc oxide (IZO), indium gallium zinc oxide (IGZO), gallium zinc oxide (GZO), or the like.

The second alignment mark 3 is provided in the same layer as any film layer on the second substrate 2. The film layer provided on the second substrate comprises a spacer column, a black matrix or a color resist layer; the materials of the spacer column and the color resist layer can be organic materials, for example, resin materials or the like; the materials of the black matrix comprise a metal material and a resin material.

Figure 2:
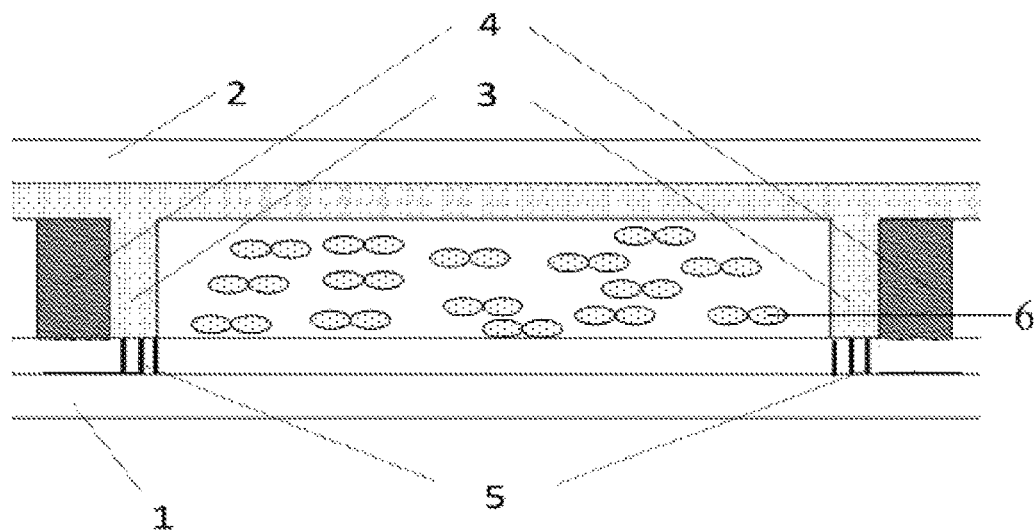
FIG. 2 is a schematic cross-sectional view of another display panel.

FIG. 2 is a schematic cross-sectional view of another display panel, which differs from the structure as illustrated in FIG. 1 in that the first alignment mark 5 only comprises a portion that matches the second alignment mark 3 and does not comprise a portion corresponding to the sealant 4.

Figure 3:
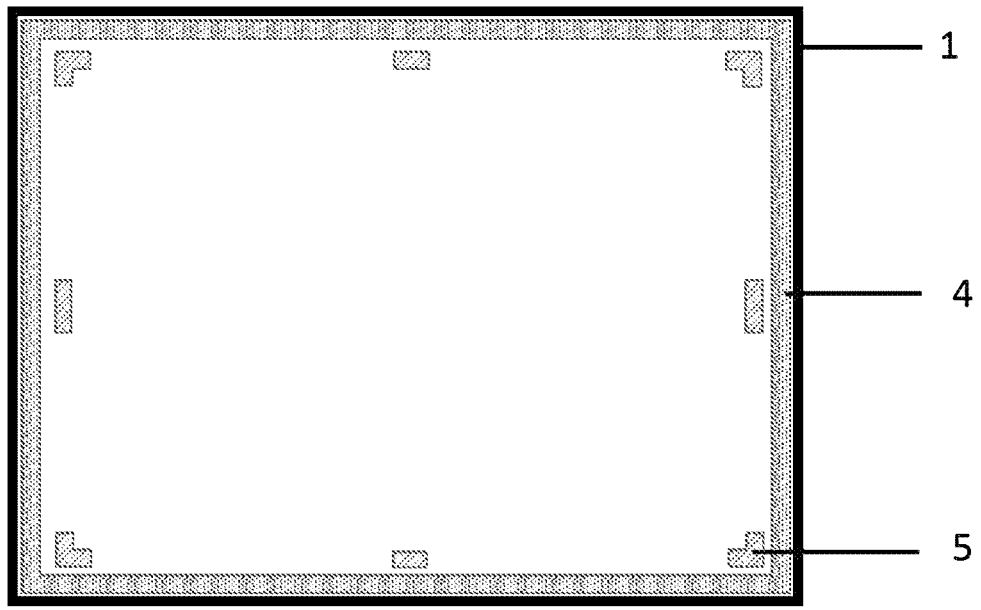
FIG. 3 is a schematic plan view of a first substrate according to Embodiment 1.

FIG. 3 is a schematic plan view of a first substrate. In the process of providing any film layer on the first substrate 1, for example, in the process of providing a passivation layer, a source/drain electrode layer, an active layer, a pixel electrode layer, a common electrode layer, a gate insulation layer, or a gate electrode layer on the first substrate, the pattern of the first alignment mark 5 is formed by a single patterning process.

Figure 4:
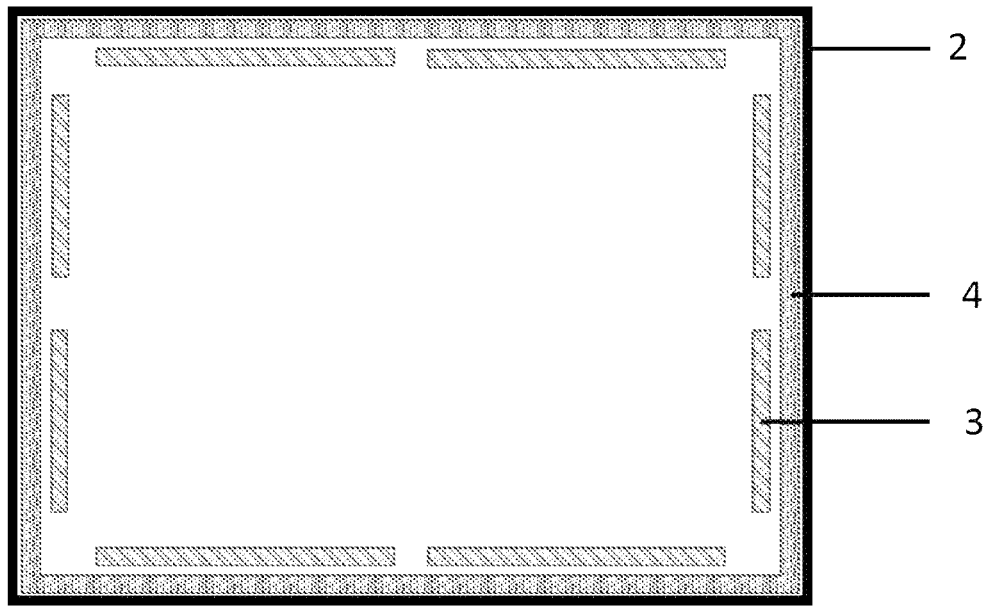
FIG. 4 is a schematic plan view of a second substrate according to Embodiment 1.

FIG. 4 is a schematic plan view of a second substrate. In the process of providing any film layer on the first substrate 2, for example, in the process of providing a spacer column, a black matrix, or a color resist layer on the second substrate, the pattern of the second alignment mark 3 is formed by a single patterning process.

For example, the shape of the first alignment mark 5 is of a right angle shape or an incompletely closed rectangle. The assembling accuracy and the accuracy of the sealant application process can be effectively improved by using the first alignment mark 5 and the second alignment mark 3 as reference upon applying the sealant and performing the assembling process.

The shape of the first alignment mark 5 provided on the first substrate 1 is complementary to that of the second alignment mark 3 provided on the second substrate 2 in a plan view direction, which leads to the formation of a complete rectangle, thereby effectively improving the assembling accuracy.

The second alignment mark 3 has a thickness which is the same as the thickness of the liquid crystal cell formed by assembling the first substrate 1 and the second substrate 2 together. The second alignment mark 3 can completely block the sealant, prevent the liquid crystal from contacting the sealant, reduce the impact of diffusion of the liquid crystal encircled the substrate on the surrounding sealant, avoid insufficient coating of sealant, and prevent the uncured sealant from contaminating the liquid crystal.

For example, the sealant comprises a skeleton (or support) component comprising a silicon sphere, a glass fiber or a mixture thereof. The second alignment mark 3 has a thickness which is the same as the thickness of the liquid crystal cell formed by assembling the first substrate 1 and the second substrate 2, and thus serves the supporting function and reduces the amount of the skeleton component in the sealant, for example, the sealant comprises a skeleton component of greater than or equal to 0 and less than or equal to 1% by mass.

It shall be noted that the pattern of the first alignment mark can be provided on the first substrate or the second substrate, and matches the second alignment mark provided on the other substrate.

Embodiment 2

The present embodiment provides a display panel, comprising a first substrate 1 and a second substrate 2 disposed opposite to each other, a liquid crystal layer between the first substrate 1 and the second substrate 2, a sealant 4 provided on a periphery of the first substrate 1 and the second substrate 2 for bonding the first substrate 1 and the second substrate 2, a first alignment mark 5 disposed on the first substrate 1, and a second alignment mark 3 disposed on the second substrate 2; the second alignment mark 3 is provided on a side of the sealant 4, which side is adjacent to the liquid crystal layer 6, i.e., the second alignment mark 3 is provided between the sealant 4 and the liquid crystal layer 6. As illustrated in FIG. 1 and FIG. 2, the first alignment mark 5 and the second alignment mark 3 match each other in a plan view direction according to their preset shapes, which can effectively improve and detect the assembling accuracy. In addition, the second alignment mark 3 can also prevent diffusion of the uncured sealant to improve the application accuracy of the sealant.

The first alignment mark 5 is provided in the same layer as any film layer on the first substrate 1. The film layer provided on the first substrate 1 comprises a passivation layer, a source/drain electrode layer, an active layer, a pixel electrode layer, a common electrode layer, a gate insulation layer or a gate electrode layer. For example, the materials of the source/drain electrode layer and the gate electrode layer include any one or any combination of copper, molybdenum and titanium; the material of the gate insulation layer includes silicon nitride ($SiN_x$), silicon oxide ($SiO_x$), aluminum oxide ($Al_2O_3$), aluminum nitride (AlN) or other suitable material; the material of the passivation layer includes silicon nitride ($SiN_x$), silicon oxide ($SiO_x$), or an acrylic resin; the material of the active layer includes an oxide semiconductor, a polysilicon semiconductor or the like; the materials of the pixel electrode layer and the common electrode layer include a transparent conductive material, for example, tin indium oxide (ITO), indium zinc oxide (IZO), indium gallium zinc oxide (IGZO), gallium zinc oxide (GZO), or the like.

The second alignment mark 3 is provided in the same layer as any film layer on the second substrate 2. The materials of the spacer column and the color resist layer may be organic materials such as resin materials or the like; the materials of the black matrix include a metal material and a resin material.

Figure 6:
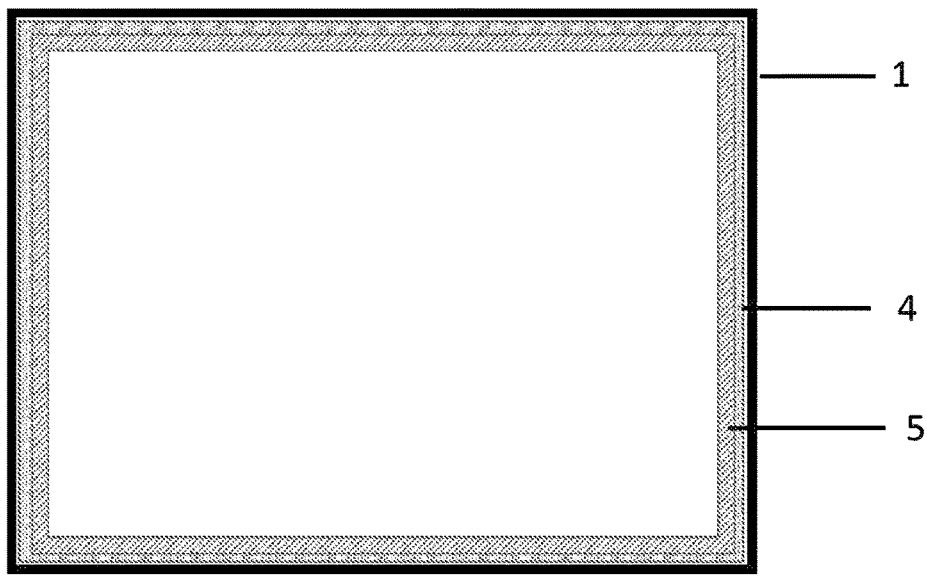
FIG. 6 is a schematic plan view of a first substrate according to Embodiment 2.

FIG. 6 is schematic plan view of a first substrate. In the process of providing any film layer on the first substrate 1, for example, in the patterning process in which a passivation layer, a source/drain electrode layer, an active layer, a pixel electrode layer, a common electrode layer, a gate insulation layer, a gate electrode layer or the like is provided on the first substrate 1, the pattern of the first alignment mark 5 is provided by a single patterning process. The first alignment mark 5 is provided adjacent to the sealant 4, or the first alignment mark 5 and the sealant 4 have areas overlapping each other.

Figure 5:
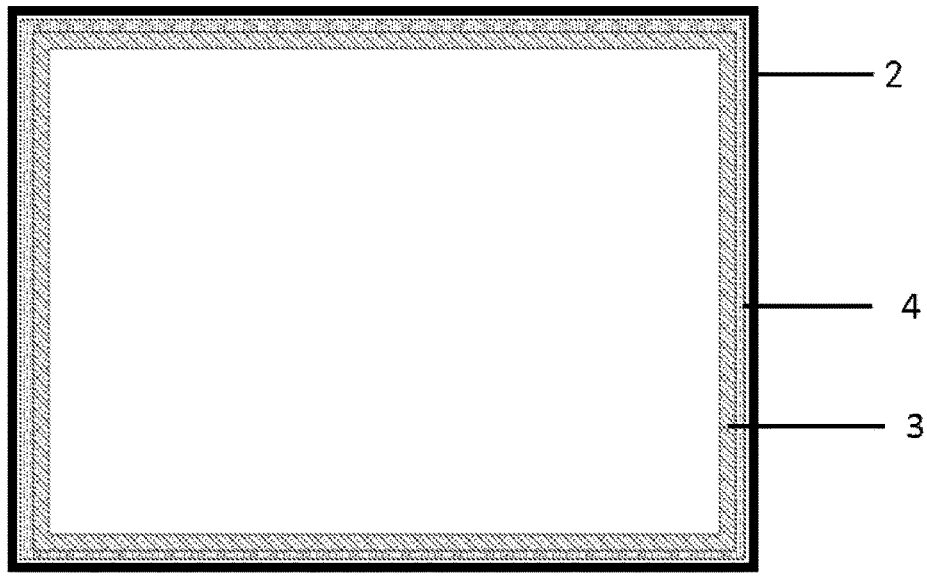
FIG. 5 is a schematic plan view of a second substrate according to Embodiment 2.

FIG. 5 is schematic plan view of a second substrate. In the process of providing any film layer on the second substrate 2, for example, in the patterning process in which a spacer column, a black matrix or a color resist layer is provided on the second substrate 2, the pattern of the second alignment mark 3 is provided by a single patterning process; the shape of the alignment mark 5 is a completely closed rectangle. The second alignment mark 3 is disposed adjacent to the sealant 4, or the second alignment mark 3 and the sealant 4 have areas overlapping each other. The assembling accuracy and the accuracy of the sealant application process can be effectively improved by using the first alignment mark 5 and the second alignment mark 3 as reference upon application of the sealant and assembling.

The first alignment mark 5 provided on the first substrate 1 and the second alignment mark 3 provided on the second substrate 2 have the same shape in the plan view direction, which can effectively improve and detect the assembling accuracy.

The second alignment mark 3 has a thickness which is the same as the thickness of the liquid crystal cell formed by assembling the first substrate and the second substrate. The second alignment mark 3 can completely block the sealant, prevent the liquid crystal from contacting the sealant, reduce the impact of diffusion of the liquid crystal inside the substrate on the surrounding sealant, avoid insufficient coating of sealant, and prevent the uncured sealant from contaminating the liquid crystal. The sealant comprises a skeleton (support) component comprising a silicon sphere, a glass fiber or a mixture thereof. The second alignment mark 3 has a thickness which is the same as the thickness of the liquid crystal cell formed by assembling the first substrate 1 and the second substrate 2 together, and thus serves the supporting function and reduces the amount of the skeleton component in the sealant, for example, the sealant comprises a silicon sphere of greater than or equal to 0 and less than or equal to 1% by mass.

It shall be noted that the pattern of the first alignment mark can be provided on the first substrate or the second substrate, and matches the second alignment mark provided on the other substrate.

Embodiment 3

The present embodiment provides a display device comprising the display panel according to Embodiments 1 and 2.

The display device can be any product or component having display function such as a mobile phone, a tablet, a TV set, a display, a laptop, a digital photo frame, a navigator, or the like. Reference can be made to the examples of the display panel in Embodiments 1 and 2 for the example of the display device, and no further detail will be given here.

Embodiment 4

The embodiment of the present disclosure further provides a method of manufacturing a display panel. As illustrated in FIG. 1 to FIG. 6, the method of manufacturing a display panel comprises the following operations:

providing a first substrate 1 and a second substrate 2 disposed opposite to each other;

forming a first alignment mark 5 on a periphery of the first substrate 1 by a patterning process, for example, as illustrated in FIG. 3;

forming a second alignment mark 3 on a periphery of the second substrate 2 by a patterning process, for example, as illustrated in FIG. 4;

matching the first alignment mark 5 with the second alignment mark 3 in a plan view direction according to their preset shapes;

applying a sealant 4 between the first substrate 1 and the second substrate 2 and on an outer side of the second alignment mark 3;

forming a liquid crystal layer 6 on an inner side of the second alignment mark 3; and assembling the first substrate 1 and the second substrate 2 by aligning the first alignment mark 5 with the second alignment mark 3 in accordance with the preset shapes to form a liquid crystal cell.

The assembling accuracy can be effectively improved and detected by aligning the first alignment mark with the second alignment mark. In addition, the second alignment mark 3 can also block diffusion of the uncured sealant, thereby improving the application accuracy of the sealant.

A first alignment mark 5 is formed on any film layer on the first substrate 1 by a single patterning process. The above patterning process includes exposing with a mask, developing, etching, and removing of photoresist; the exposing process can include a half-tone or multi-gray masking process and the etching process can include a wet etching process or a dry etching process.

The film layer formed on the first substrate 1 comprises a passivation layer, a source/drain electrode layer, an active layer, a pixel electrode layer, a common electrode layer, a gate insulation layer, and a gate electrode layer.

A second alignment mark 3 is formed on any film layer on the second substrate 2 by a single patterning process. The above patterning process includes exposing with a mask, developing, etching and removing of photoresist; the exposure process can include a half-tone or multi-gray mask process and the etching process can include a wet etching process or a dry etching process.

The film layer formed on the second substrate 2 comprises a spacer layer, a black matrix layer, or a color resist layer.

The processes of preparing a film layer on the first substrate and the second substrate include magnetron sputtering, chemical vapor deposition, thermal evaporation, laser evaporation, sol-gel or atomic layer deposition.

As illustrated in FIG. 3, the preset shape of the first alignment mark 5 is of a right angle shape or an incompletely closed rectangle.

The shape of the second alignment mark is complementary to or at least partially overlaps the shape of the first alignment mark in a plan view direction in the assembling process. The assembling accuracy and the accuracy of the sealant application process can be effectively improved by using the first alignment mark 5 and the second alignment mark 3 as reference upon application of the sealant and assembling.

The second alignment mark 3 has a thickness which is the same as the thickness of the liquid crystal cell formed by assembling the first substrate 1 and the second substrate 2. The second alignment mark 3 can completely block the sealant and prevent the liquid crystal from contacting the sealant, reduce the impact of diffusion of the liquid crystal inside the substrate on the surrounding sealant, and prevent the uncured sealant from contaminating the liquid crystal.

The sealant comprises a skeleton (support) component comprising a silicon sphere, a glass fiber or a mixture thereof, wherein the skeleton component accounts for greater than or equal to 0 and less than or equal to 1% by mass of the sealant. Moreover, the second alignment mark 3 has a thickness which is the same as the liquid crystal cell formed by assembling the first substrate 1 and the second substrate 2, and thus serves the support function and reduces the amount of the skeleton component in the sealant.

It shall be noted that the pattern of the first alignment mark can be formed on the first substrate or the second substrate by a patterning process, and a second alignment mark which matches the pattern of the first alignment mark is formed on the other substrate by a pattering process.

Embodiments of the present disclosure at least have the following beneficial technical effects: the first alignment mark provided on the first substrate and the second alignment mark provided on the second substrate match in shape in a plan view direction during the assembling process, which can effectively improve the assembling accuracy of the first substrate and the second substrate. On this basis, the second alignment mark provided between the sealant and the liquid crystal layer has a thickness which is the same as the liquid crystal cell formed by assembling the first substrate and the second substrate, and thus serves support function, block diffusion of the sealant and prevent liquid crystal contamination.

It shall be understood that the above embodiments are merely exemplary embodiments employed for the purpose of illustrating the principles of the present disclosure, but the present disclosure is not limited thereto. Various modifications and improvements can be made by a person of ordinary skill in the art without departing from the spirit and essence of the present disclosure, which are also deemed to be within the scope of protection of the present disclosure.

The present application claims the priority of the Chinese patent application No. 201610005831.7 submitted on Jan. 5, 2016, and the content disclosed in the above Chinese patent application is incorporated herein by reference as part of the present application.

What is claimed is:
1. A display panel comprising:
  a first substrate and a second substrate disposed opposite to each other;
  a liquid crystal layer between the first substrate and the second substrate;
  a sealant provided on a periphery of the first substrate and the second substrate for bonding the first substrate and the second substrate; and
  a first alignment mark disposed on the first substrate and a second alignment mark disposed on the second substrate;

wherein the second alignment mark is provided on a side, adjacent to the liquid crystal layer, of the sealant, and the first alignment mark and the second alignment mark match in a plan view direction according to their preset shapes so as to form a complete rectangle.

2. The display panel according to claim 1, wherein the first alignment mark is provided in a same layer as any film layer on the first substrate.

3. The display panel according to claim 2, wherein the first substrate is provided with a passivation layer, a source/drain electrode layer, an active layer, a pixel electrode layer, a common electrode layer, a gate insulation layer, or a gate electrode layer.

4. The display panel according to claim 1, wherein the second alignment mark is provided in a same layer as any film layer on the second substrate.

5. The display panel according to claim 4, wherein the second substrate is provided with a spacer, a black matrix, or a color resist layer.

6. The display panel according to claim 1, wherein the preset shape of the first alignment mark includes a right angle shape, an incompletely closed rectangle, or a closed rectangle.

7. The display panel according to claim 6, wherein the shape of the second alignment mark is complementary to or at least partially overlaps the shape of the first alignment mark in a plan view direction.

8. The display panel according to claim 1, wherein a thickness of the second alignment mark is the same as a distance between the first substrate and the second substrate.

9. The display panel according to claim 1, wherein the sealant comprises a skeleton component comprising at least one of a silicon sphere and a glass fiber.

10. The display panel according to claim 9, wherein the skeleton component accounts for greater than or equal to 0 and less than or equal to 1% by mass of the sealant.

11. A display device, comprising the display panel according to claim 1.

12. A method of manufacturing a display panel, comprising:
    providing a first substrate and a second substrate opposite to each other;
    forming a first alignment mark on a periphery of the first substrate by a patterning process;
    forming a second alignment mark on a periphery of the second substrate by a patterning process;
    matching the first alignment mark with the second alignment mark in a plan view direction according to their preset shapes;
    applying a sealant between the first substrate and the second substrate and on an outer side of the second alignment mark;
    forming a liquid crystal layer on an inner side of the second alignment mark; and
    assembling the first substrate and the second substrate by aligning the first alignment mark with the second alignment mark in accordance with the preset shapes so as to form a complete rectangle.

13. The method of manufacturing a display panel according to claim 12, wherein the first alignment mark and any film layer on the first substrate are formed by a single patterning process.

14. The method of manufacturing a display panel according to claim 13, wherein the first substrate is provided with a passivation layer, a source/drain electrode layer, an active layer, a pixel electrode layer, a common electrode layer, a gate insulation layer, or a gate electrode layer.

15. The method of manufacturing a display panel according to claim 14, wherein the second alignment mark and any film layer on the second substrate are formed by a single patterning process.

16. The method of manufacturing a display panel according to claim 15, wherein the second substrate is provided with a spacer layer, a black matrix layer, or a color resist layer.

17. The method of manufacturing a display panel according to claim 12, wherein the preset shape of the first alignment mark includes a right angle shape, an incompletely closed rectangle, and a closed rectangle.

18. The method of manufacturing a display panel according to claim 12, wherein the shape of the second alignment mark is complementary to or at least partially overlaps the shape of the first alignment marks in a plan view direction during assembling the first substrate and the second substrate.

19. The method of manufacturing a display panel according to claim 12, wherein the second alignment mark has a thickness which is the same as a distance between the first substrate and the second substrate.

* * * * *